US012019896B2

(12) United States Patent
Guttapalem et al.

(10) Patent No.: US 12,019,896 B2
(45) Date of Patent: Jun. 25, 2024

(54) MECHANISMS FOR GROUPING NODES

(71) Applicant: salesforce.com, inc., San Francisco, CA (US)

(72) Inventors: Charan Reddy Guttapalem, Fremont, CA (US); Hemanth Siddulugari, Dublin, CA (US); Venkateswararao Jujjuri, Beaverton, OR (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/519,798

(22) Filed: Nov. 5, 2021

(65) Prior Publication Data

US 2023/0147295 A1    May 11, 2023

(51) Int. Cl.
  *G06F 3/00*    (2006.01)
  *G06F 3/06*    (2006.01)
  *G06F 16/27*   (2019.01)
(52) U.S. Cl.
  CPC ............ *G06F 3/065* (2013.01); *G06F 3/0604* (2013.01); *G06F 3/0629* (2013.01); *G06F 3/067* (2013.01); *G06F 16/27* (2019.01)
(58) Field of Classification Search
  None
  See application file for complete search history.

(56) References Cited

U.S. PATENT DOCUMENTS

| | | | |
|---|---|---|---|
| 11,294,931 B1 * | 4/2022 | Ren | ......................... G06F 16/27 |
| 2010/0198970 A1 | 8/2010 | Ingle et al. | |
| 2019/0235775 A1 | 8/2019 | Zwiegincew et al. | |
| 2019/0235851 A1 | 8/2019 | Vergara | |
| 2022/0214995 A1 * | 7/2022 | Wu | ........................ G06F 16/113 |
| 2022/0377077 A1 * | 11/2022 | Gokhale | ............... H04L 63/101 |

FOREIGN PATENT DOCUMENTS

| | | | | |
|---|---|---|---|---|
| CN | 111770154 A | * | 10/2020 | |
| CN | 114064668 A | * | 2/2022 | .......... G06F 11/1469 |

* cited by examiner

*Primary Examiner* — Midys Rojas
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to upgrade groups. A node of a computer system may access metadata assigned to the node during deployment of the node. The node may be one of a plurality of nodes associated with a service that is implemented by the computer system. The node may perform an operation on the metadata to derive a group identifier for the node and the group identifier may indicate the node's membership in one of a set of groups of nodes managed by the service. The node may then store the group identifier in a location accessible to the service.

17 Claims, 8 Drawing Sheets

MECHANISMS FOR GROUPING NODES

BACKGROUND

Technical Field

This disclosure relates generally to a storage system and, more specifically, to various mechanisms for grouping nodes of a service.

Description of the Related Art

Enterprises routinely implement database management systems (or, simply "database systems") that enable users to store a collection of information in an organized manner that can be efficiently accessed and manipulated. During operation, a database system receives requests from users via applications (e.g., an application server) or from other systems, such as another database system, to perform transactions. When performing a transaction, the database system often reads requested data from a database whose data is stored by a storage service and writes data to the database via the storage service. Consequently, the storage service typically serves as a persistent storage repository for the database system.

DETAILED DESCRIPTION

Figure 1:
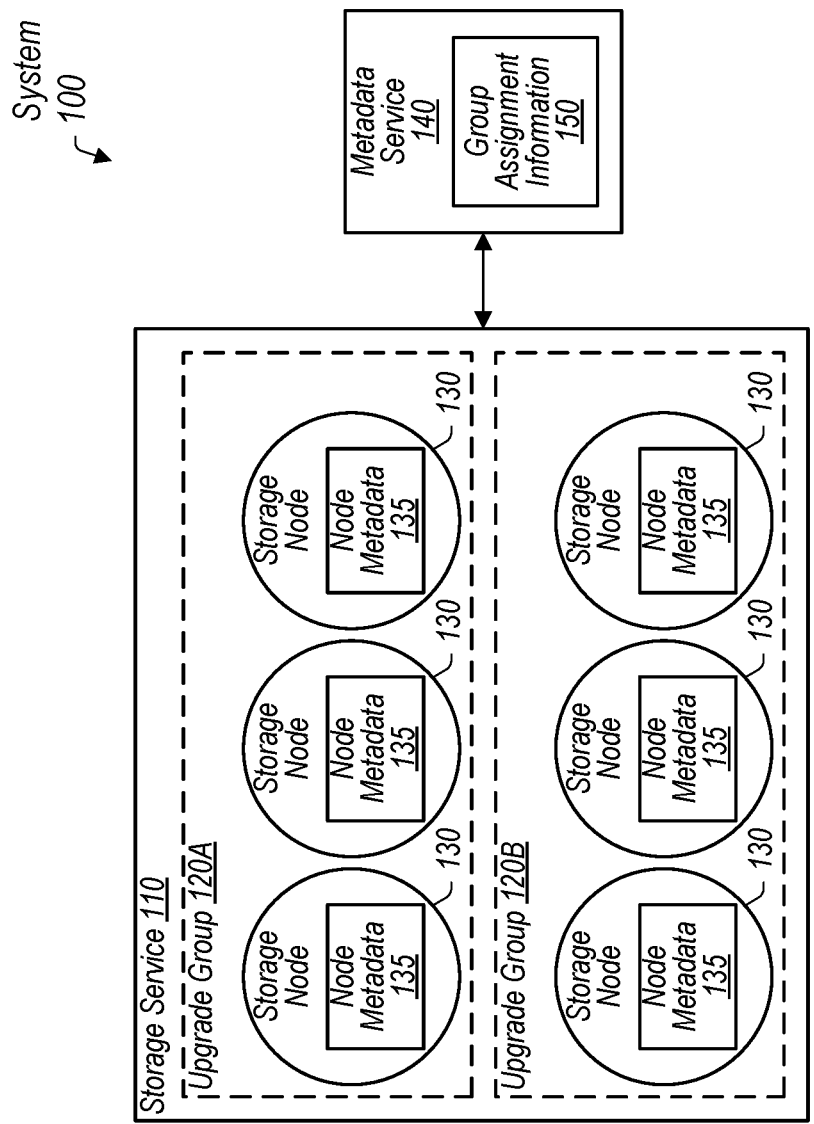
FIG. 1 is a block diagram illustrating example elements of a system having a metadata service and a storage service comprising a set of storage nodes distributed into upgrade groups, according to some embodiments.

In some implementations, a storage service comprises multiple storage nodes that store the data of the storage service. Those storage nodes are often implemented on virtual machines having their own underlying operating systems. Over time, updates are developed for a storage node or the operating system of its virtual machine that take a considerable amount of time to be applied. For example, updating the operating system image can take several minutes. As a result, it can be a challenging process to update the storage nodes without noticeable downtime or other disruption of the storage service. Upgrading one storage node at a time is reasonable when the number of storage nodes of the storage service is small, but as the number of storage nodes grows, the upgrade time grows as well. At a certain point, with too many storage nodes, the upgrade time becomes unacceptable if the upgrade is performed one node at a time. Consequently, a parallel approach can be applied in which multiple storage nodes are updated at a time.

Data stored at a storage service is often replicated across multiple storage nodes so that if the storage component of a storage node fails, then the data stored on that storage component is not lost from that service and can continue to be served from the other storage nodes. But updating multiple storage nodes in parallel without consideration of which storage nodes are chosen can result in scenarios in which all the storage nodes that store a certain piece of data are taken down, with the result that the certain piece of data becomes unavailable. Thus, it may be desirable to group storage nodes such that a group of nodes can be updated while the data on those nodes is still accessible from other storage nodes of the storage service. Furthermore, it may be desirable to limit the number of groups so that the update process can be timebound (e.g., with 12 groups, the update time will be 12 times the time involved in performing parallel patching of nodes within a single group) instead of allowing the number of groups to increase as storage nodes are added to the storage service, otherwise the update process may suffer the problem that occurs when upgrading one node at a time. The present disclosure addresses, among other things, the problem of how to group storage nodes into a fixed number of groups while still allowing for storage nodes to be added and for data to continue to be available when a group is taken down to be updated.

In various embodiments that are described below, a system includes a storage service and a metadata service. The system may also include a deployment service. During operation, the deployment service may deploy storage nodes of the storage service using resources of a cloud-based infrastructure administered by a cloud provider. After being deployed, a storage node accesses metadata that was assigned to it by the deployment service and then performs an operation (e.g., a modulo operation) on the metadata to derive a group identifier that indicates the node's membership in one of a set of groups that is managed by the storage service. The storage node may write that group identifier to the metadata service such that the group identifier is available to other nodes of the storage service (and other services) for determining that node's group membership. The storage service may operate on deployed storage nodes according to group identifiers that are stored at the metadata service for those nodes. For example, when ensuring that a certain piece of data is replicated across multiple nodes, the storage service may use the group identifiers to determine which nodes belong to which groups so that the storage service can ensure that the piece of data is not replicated on only storage nodes within the same group. As a result, when a group of storage node is taken down for an update, the piece of data can continue to be served by other storage nodes. While storage nodes are discussed, the techniques disclosed herein can be applied to other types of nodes, such as database nodes, application nodes, etc.

These techniques may be advantageous as they permit storage nodes to be grouped into a fixed number of groups while allowing for storage nodes to be added and for data to continue to be available when a group is unavailable. In particular, the use of a modulo operation allows for the number of groups to be fixed as a group identifier that results from the modulo operation will fall within a range of numbers defined by the divisor of the modulo operation. That is, the metadata assigned to a storage node may include a node ordinal number and despite its value, the module operation will conform it to a fixed range of numbers, each of which can correspond to a group. Moreover, by making group identifiers accessible, the storage service may ensure that the same data is not replicated within only the same node group. Furthermore, the storage nodes deriving the group identifiers themselves instead of being told their groups can allow for deployment services to be used that are agnostic about the upgrade groups. As a result, control of the upgrade groups can be shifted to the storage service. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software. Within the illustrated embodiment, system 100 includes a storage service 110 and a metadata service 140. As depicted, storage service 110 includes a set of storage nodes 130 that are grouped into upgrade groups 120A-B and include respective node metadata 135. As further depicted, metadata service 140 includes group assignment information 150. System 100 might be implemented differently than shown. As an example, system 100 may include a deployment service, storage service 110 may include more or less storage nodes 130 than illustrated, and/or storage nodes 130 may be grouped into a greater number of upgrade groups 120.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Storage service 110 and metadata service 140 may thus execute on and utilize the available cloud resources of that cloud infrastructure (e.g., computing resources, storage resources, network resources, etc.) to facilitate their operation. For example, a storage node 130 may execute in a virtual environment hosted on server-based hardware that is included within a datacenter of the cloud provider. But in some embodiments, system 100 is implemented utilizing a local or private infrastructure as opposed to a public cloud.

Storage service 110, in various embodiments, provides persistent storage for the users and components associated with system 100. For example, system 100 may include a database service that implements a database, the data of which is stored by storage service 110. As such, when the database service receives a request to perform a transaction that involves reading and writing data for the database, the database service may interact with storage service 110 to read out requested data and store requested data. Storage service 110, in various embodiments, is a scalable, durable, and low latency service that is distributed across multiple storage nodes 130 that may reside within different zones of a cloud. As depicted, storage service 110 is distributed over six storage nodes 130. Over time, storage nodes 130 may be added/removed from storage service 110 as demand changes.

A storage node 130, in various embodiments, is a server that is responsible for storing at least a portion of the data that is stored at storage service 110 and for providing access to the data upon authorized request. In various embodiments, a storage node 130 encompasses both software and the hardware on which that software is executed, while in some embodiments, it encompasses only the software. A storage node 130 may include and/or interact with a single or multiple storage devices that are connected together on a network (e.g., a storage attached network (SAN)) and configured to redundantly store information in order to prevent data loss. Those storage devices may store data persistently and thus storage service 110 may serve as a persistent storage for system 100.

In various embodiments, a storage node 130 stores two main types of files (also herein referred to as "extents"): a data file and a log file. A data file may comprise the actual data and may be append-only such that new records are appended to that data file until a size threshold is reached. In some embodiments, once a data file is written, it is immutable and thus to replace its data includes writing a new data file. A log file may comprise log entries describing database modifications made as a result of executing database transactions. Similarly to data files, a log file may be append-only and may continuously receive appends as transactions do work. Data files and log files, in various embodiments, are associated with file identifiers that can be used to locate them. Accordingly, a storage node 130 may receive requests from database nodes that specify file identifiers so that the corresponding files can be accessed and returned.

In order for storage service 110 to be fault tolerant to unexpected failures, wide outages, and planned shutdowns of storage nodes 130, in various embodiments, data files and log files are replicated such that multiple copies of those files are stored across different storage nodes 130 of storage service 110. Consequently, a storage node 130 may suffer an unexpected failure but the files stored on that storage node 130 may still be accessed via the copies that are stored on other storage nodes 130. To ensure that files are properly replicated, in some embodiments, storage nodes 130 execute a data replication engine that is distributed across the storage nodes 130. When a file is created, the data replication engine may use a placement policy to select a set of storage nodes 130 to store that file. In some embodiments, a separate client of storage service 110 is responsible for initially storing copies across storage nodes 130 while the data replication engine is responsible for handling cases in which a copy is lost (e.g., a storage node 130 fails). The placement policy may take into account upgrade groups 120. A data replication engine is described in greater detail with respect to FIGS. 3 and 4.

As mentioned, it may be desirable to update multiple storage nodes 130 at a time. Thus, storage nodes 130 can be grouped into upgrade groups 120. An upgrade group 120, in various embodiments, is a group of storage nodes 130 that can be updated as a unit such that when an update is applied to that group, all storage nodes 130 of the group are updated (absent a storage node 130 failing or otherwise being unable to complete that update). In many cases, a portion (e.g., two or more) or all of the storage nodes 130 of an upgrade group 120 are updated at least partially in parallel. Furthermore, an update applied to an upgrade group 120 may be completed by that upgrade group 120 before the update is applied to another upgrade group 120. As such, when an update is applied to storage service 110, the update may be applied one upgrade group 120 at a time.

In various embodiments, upgrade groups 120 are constructed by the storage nodes 130 themselves based on node metadata 135. In particular, when a storage node 130 is deployed, it may be assigned metadata 135 by the deployment service that deploys it. A deployment service is discussed in more detail with respect to FIG. 2. Node metadata 135, in various embodiments, includes information that can be used by a storage node 130 to facilitate its own operation. For example, node metadata 135 may identify the storage devices associated with the storage node 130, network information (e.g., IP addresses, ports, etc.), location information (e.g., datacenter, region, etc.), and configuration information. In various embodiments, to determine its upgrade group 120, a storage node 130 executes an operation on its node metadata 135 to derive a group identifier that was not included in that node metadata 135 and that indicates to which upgrade group 120 that the storage node 130 belongs. The process for deriving that group identifier is discussed in more detail with respect to FIG. 2. A storage node 130 may then provide the group identifier to metadata service 140.

Metadata service 140, in various embodiments, is a metadata repository used for storing various pieces of metadata that facilitate the operation of storage service 110 and other services of system 100, such as a database service. Metadata service 140 may be implemented by a set of servers that are separate from, but accessible to, storage nodes 130 and hence it may be a shared repository. As depicted, metadata service 140 stores group assignment information 150. Group assignment information 150, in various embodiments, includes the group identifiers that were provided by storage nodes 130. Consequently, an entity that wishes to determine how storage nodes 130 are grouped may access group assignment information 150. While group assignment information 150 is stored at metadata service 140 in FIG. 1, group assignment information 150 may be stored in a distributed manner across storage nodes 130. As discussed in greater detail with respect to FIG. 3, group assignment information 150 can be used when distributing copies of data and log files across upgrade groups 120 to ensure that storage service 110 remains fault tolerant in view of upgrade groups 120. While not shown, metadata service 140 may also store other metadata describing the users that are permitted to access database information, analytics about tenants associated with system 100, etc. Metadata service 140 may also store information that identifies which storage nodes 130 store which data/log files. This information may be used by storage service 110 to determine which files should be replicated when a set of storage nodes 130 become unavailable (e.g., they crash).

Figure 2:
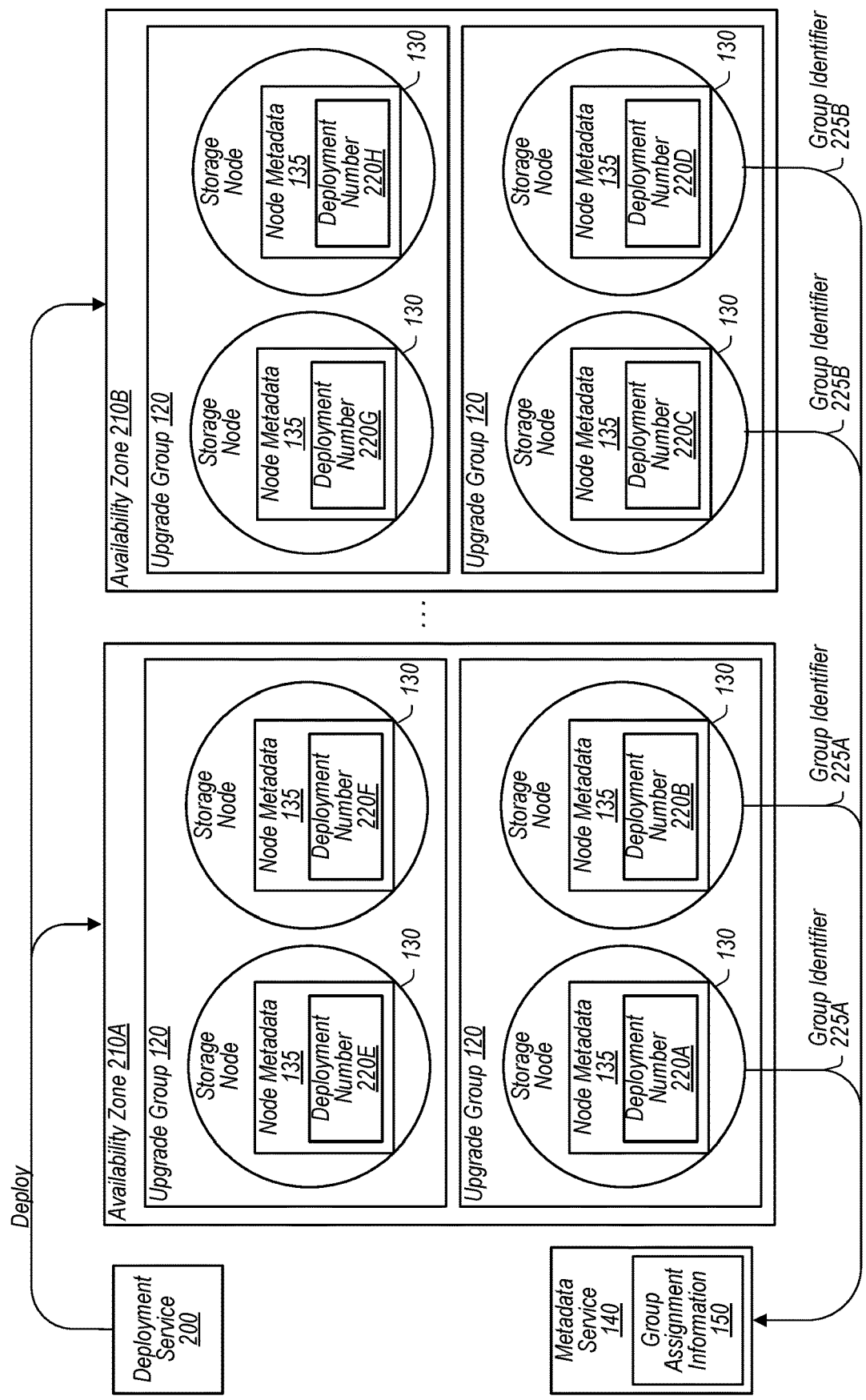
FIG. 2 is a block diagram illustrating an example deployment service deploying storage nodes that provide group identifiers to a metadata service, according to some embodiments.

Turning now to FIG. 2, a block diagram of a deployment service 200 deploying storage nodes 130 that provide group identifiers 225 to metadata service 140 is shown. In the illustrated embodiment, there is deployment service 200, availability zones 210A-B, and metadata service 140. Also as shown, availability zones 210A-B include respective sets of upgrade groups 120, which include storage nodes 130. As further shown, storage nodes 130 include node metadata 135 having respective deployment numbers 220A-H for the storage nodes 130. The illustrated embodiment may be implemented differently than shown. As an example, upgrade groups 120 may not be contained in availability zones 210 or an upgrade group 120 may include storage nodes 130 that are contained in different availability zones 210.

Deployment service 200, in various embodiments, facilitates the deployment of various components of system 100, including storage nodes 130. In some embodiments, deployment service 200 is executed on and/or utilizes the available cloud resources of a cloud infrastructure (e.g., computing, storage, etc.) to facilitate its operation. Deployment service 200 may maintain environment information about resources of that cloud and the configuration of environments that are managed by deployment service 200. Those resources may include, for example, a set of CPUs, storage devices, virtual machines, physical host machines, and network components (e.g., routers). Accordingly, the environment information might describe, for example, a set of host machines that make up a computer network, their compute resources (e.g., processing and memory capability), the software programs that are running on those machines, and the internal networks of each of the host machines. In various embodiments, deployment service 200 uses the environment information to deploy storage nodes 130 onto the resources of the cloud. For example, deployment service 200 may access the environment information and determine what resources are available and usable for deploying a storage node 130. Deployment service 200 may identify available resources and then communicate with an agent that is executing locally on the resources in order to instantiate the storage node 130 on the identified resources. While deployment service 200 is described as deploying storage nodes 130 to a public cloud, in some embodiments, deployment service 200 deploys them to local or private environments that are not provided by a cloud provider.

Examples of deployment service 200 may include, but are not limited to, Kubernetes™ and Amazon Web Services™. In the context of Kubernetes™, deployment service 200 may provide a container-centric management environment for deploying and managing application containers that are portable, self-sufficient units that have an application and its dependencies. Accordingly, deployment service 200 may deploy a storage node 130 as part of an application container on the cloud resources. In the Amazon Web Services™ context, deployment service 200 may provide a mechanism for deploying instances (workloads) of a storage node 130 onto resources that implement a cloud environment. The cloud environment may be included within an availability zone 210.

An availability zone 210, in various embodiments, is an isolated location within a data center region from which public cloud services can originate and operate. The resources within an availability zone 210 can be physically and logically separated from the resources of another availability zone 210 such that failures within one zone (e.g., power outage) may not affect the resources of the other zone. Accordingly, in various embodiments, data and log files are copied across multiple availability zones 210 so that those files can continue to be served even if the systems of one of the availability zones 210 become unavailable (e.g., due to a network failure). In some instances, a region of a cloud (e.g., northeast region of the US) may include more than one availability zone 210. For example, availability zones 210A-B may each correspond to a respective data center within the same region of a cloud.

As depicted, deployment service 200 deploys storage nodes 130 to multiple availability zones 210. Deployment service 200 may deploy a storage node 130 in response to a request or to satisfy a specification that describes a desired state for storage service 110. As an example, deployment service 200 may receive a specification specifying that storage service 110 should include at least eight storage nodes 130. As such, deployment service 200 may deploy storage nodes 130 until there are eight storage nodes 130 running. If one or more of those storage nodes 130 unexpectedly crash or shut down, deployment service 200 may deploy one or more storage nodes 130 to again reach the eight-storage-node threshold identified in the specification.

When deploying storage nodes 130, in various embodiments, deployment service 200 rotates through availability zones 210 such that deployment service 200 deploys a storage node 130 to a first availability zone 210 and then subsequently deploys another storage node 130 to a second availability zone 210 and so forth. Additionally, when deploying a storage node 130, deployment service 200 assigns a deployment number 220 to the storage node 130, as shown. A deployment number 220, in various embodiments, is a numerical value that is derived from a counter that deployment service 200 increments each time that it deploys a storage node 130. For example, deployment number 220A may be "0," number 220C may be "1," number 220E may be "2," number 220G may be "3," number 220B may be "4," number 220D may be "5," number 220F may be "6," etc. While deployment service 200 is described as rotating through availability zone 210, in some embodiments, deployment service 200 deploys multiple storage nodes 130 to an availability zone 210 (e.g., until the deployment for that zone is complete) and then deploys storage nodes 130 to another availability zone 210.

After being deployed, in various embodiments, a storage node 130 performs a modulo operation on its own deployment number 220 to derive its group identifier 225. The divisor of the modulo operation is set to determine the number of upgrade groups 120. For example, the divisor may be set to "4." Continuing the previous example about deployment numbers 220A-F, the storage node 130 of deployment number 220A may derive a group identifier 225A ("0") from the value "0" of its deployment number and the storage node 130 of deployment number 220B may also derive group identifier 225A from the value "4" of its deployment number (i.e., 4 modulo 4=0). The storage nodes 130 of deployment numbers 220C-D, however, may derive a group identifier 225B ("1") from the values "1" and "5." After generating a group identifier 225, a storage node 130 may send it to metadata service 140 so that it can be included in group assignment information 150.

Figure 3:
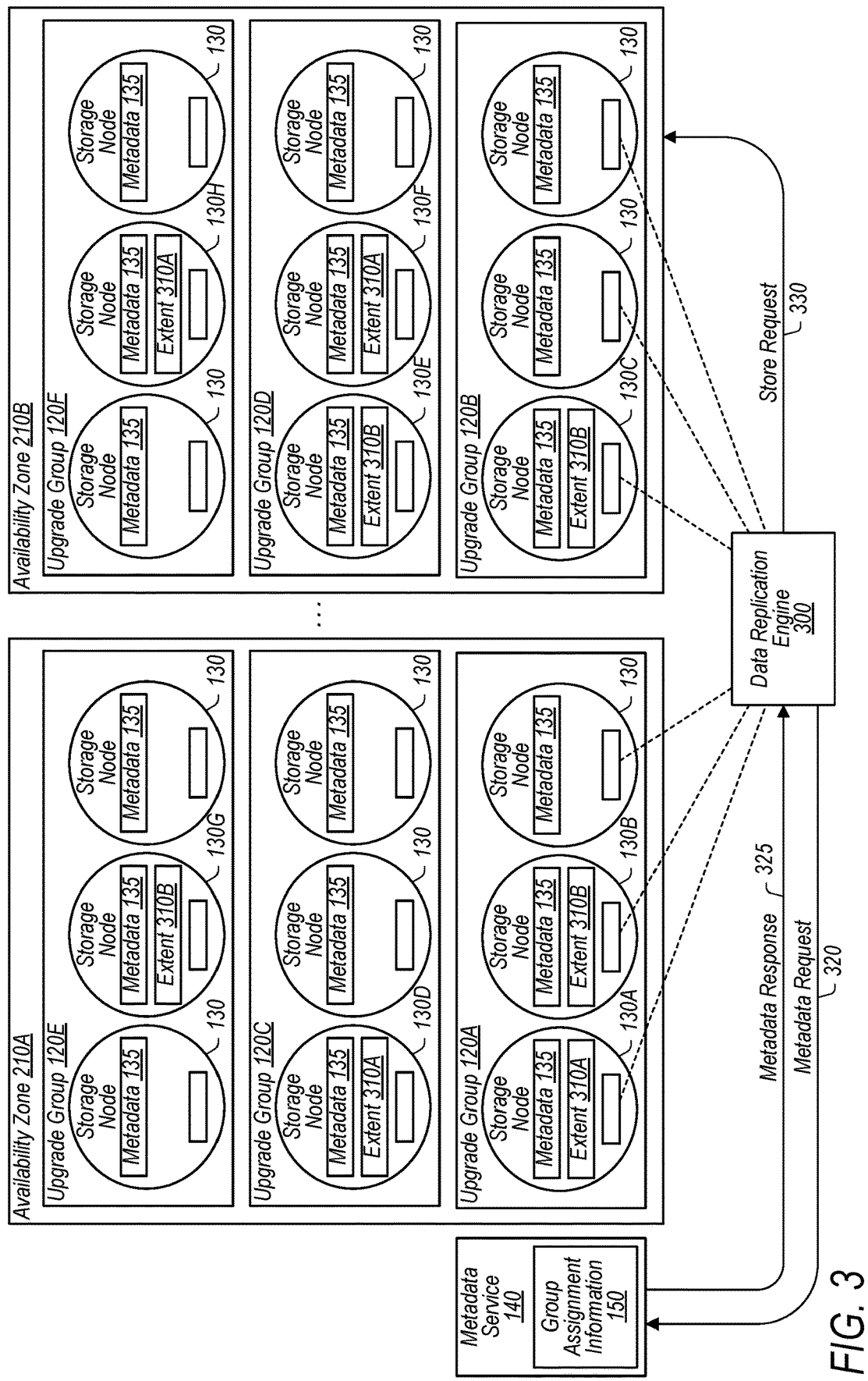
FIG. 3 is a block diagram illustrating an example data replication engine that is capable of replicating data across storage nodes, according to some embodiments.

Turning now to FIG. 3, a block diagram of a data replication engine 300 that replicates data across storage nodes 130 is shown. In the illustrated embodiment, there is metadata service 140, availability zones 210A-B, and data replication engine 300. As depicted, availability zone 210A includes upgrade groups 120A, C, and E while availability zone 210B includes upgrade groups 120B, D and F—upgrade groups 120A-F include respective sets of storage nodes 130 having metadata 135. The illustrated embodiment may be implemented differently than shown. For example, there may be more or less availability zones 210, upgrade groups 120, or storage nodes 130.

Data replication engine 300, in various embodiments, is software that is executable to cause a given piece of data to be stored by a set of storage nodes 130. As shown, data replication engine 300 is distributed across storage nodes 130 such that each storage node 130 respectively executes an instance of data replication engine 300. In various embodiments, the instances of data replication engine 300 perform an election to elect one of the instances to serve as a leader that is responsible for ensuring that data is correctly replicated within storage service 110. The remaining instances may serve as replication works that implement work dictated by the leader instance. For example, the instance executing on storage node 130A may be elected leader and it may instruct other certain storage nodes (e.g., storage node 130E) to store certain data. While data replication engine 300 is distributed in the illustrated embodiment, in some embodiments, a single instance of data replication engine 300 is executed on one of the storage nodes 130 of storage service 110. Also, while not shown, the instance of data replication engine 300 that is executing on a given storage node 130 may interact with a set of storage processes that provide the services of storage service 110.

In various embodiments, data replication engine 300 follows a set of placement policies that define how data should be replicated within storage service 110. For example, a placement policy may state that two copies of an extent 310 should be stored within each availability zone 210. An extent 310 may correspond to a data file or a log file. As another example, a placement policy might state that six copies of an extent 310 should be stored by storage service 110 and data replication engine 300 may determine that two copies should be stored in each availability zone 210 or it may determine another combination (e.g., use two availability zones 210 to each store three copies). In various embodiments, data replication engine 300 also considers upgrade groups 120 when determining where to store copies of an extent 310. As shown for example, two copies of extent 310A are stored in availability zone 210A, each belonging to a different upgrade group 120 (i.e., upgrade groups 120A and 120B). By causing at least two copies to be stored per availability zone 210 and in distinct upgrade groups 120, data replication engine 300 may ensure that an extent 310 can still be accessed even when one of the upgrade groups 120 is unavailable because it is being updated. That is, from a data availability perspective, when all the storage nodes 130 in an upgrade group 120 are brought down for doing parallel patching, there may not be data unavailability issues. As an example, upgrade group 120A may be taken down for an update, but extent 310A may still be accessed from upgrade group 120C.

In addition to the above considerations, data replication engine 300 may also consider what and how many extents 310 that a storage node 130 already stores. As an example, instead of storing both extent 310A and 310B on storage node 130E, data replication engine 300 may store extent 310A on storage node 130F as depicted. Likewise, instead of storing extents 310A and 310B in the same set of upgrade groups 120, data replication engine 300 may store extent 310A in upgrade groups 120D and 120F of availability zone 210B and extent 310B in upgrade groups 120B and 120B of availability zone 210B.

When an extent 310 is being created, in various embodiments, data replication engine 300 uses a placement policy and group assignment information 150 to select storage nodes 130 for storing that extent 310. As such, data replication engine 300 may issue a metadata request 320 to metadata service 140 for group assignment information 150 and then receive a metadata response 325 that includes that information. Data replication engine 300 may then select a set of storage nodes 130 and issue store requests 330 to those selected storage nodes 130 to cause them to store the relevant extent 310. As discussed in greater detail with respect to FIG. 4, data replication engine 300 may continue to monitor storage nodes 130 to ensure that the number of available copies of a given extent 310 continues to satisfy the threshold amount specified in the set of placement policies. While data replication engine 300 is described as causing extents 310 to be stored by storage nodes 130, in some embodiments, a separate client causes storage nodes 130 to store the copies of an extent 310. In such embodiments, data replication engine may ensure that a desired number of copies is maintained in storage service 110 by replicating copies on other storage nodes 130 in the event of copies being lost/unavailable (e.g., due to a storage node 130 failing that stored an original copy).

Figure 4:
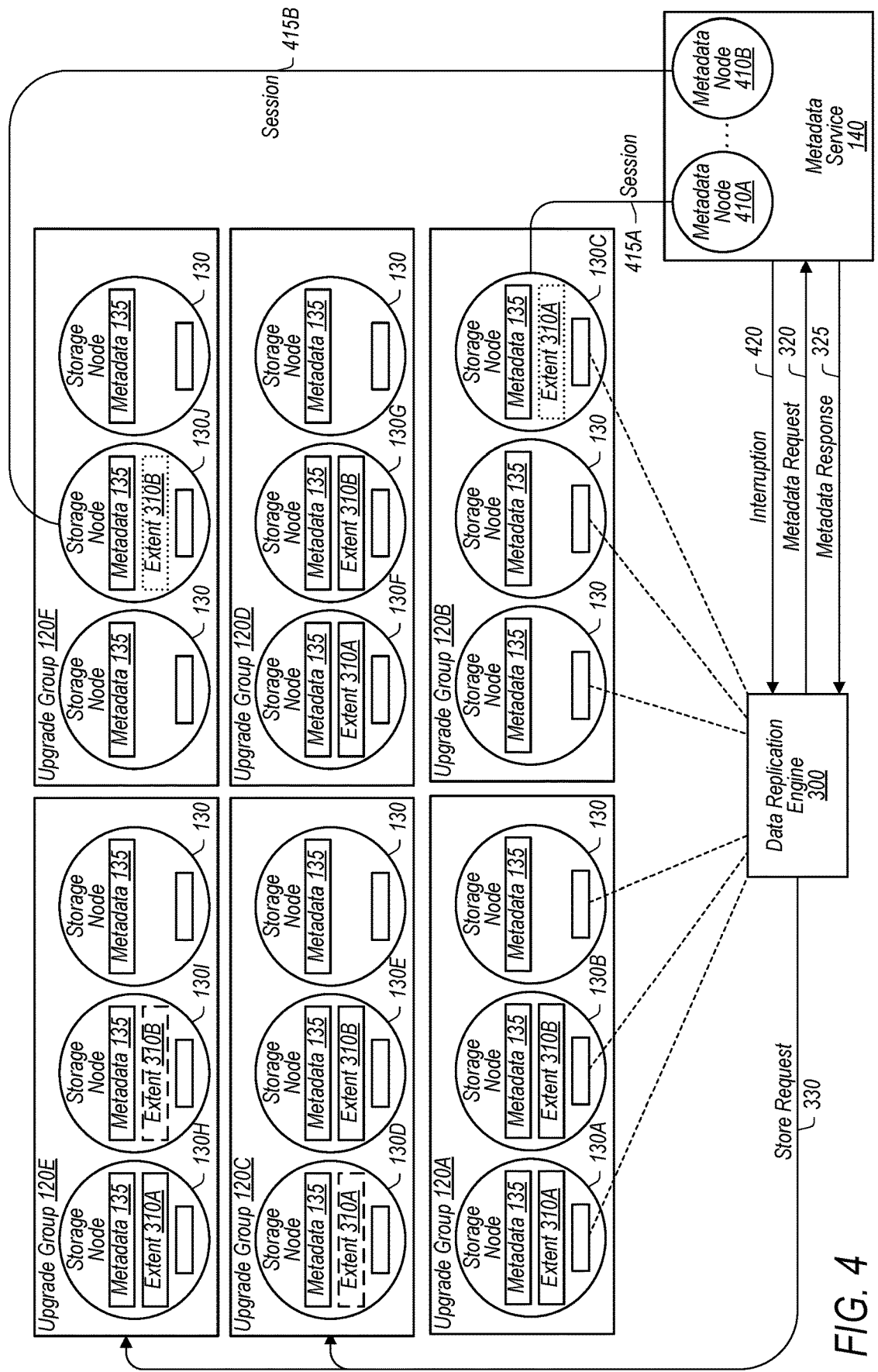
FIG. 4 is a block diagram illustrating an example data replication engine that is capable of detecting that a set of storage nodes has gone down and causing data replication, according to some embodiments.

Turning now to FIG. 4, a block diagram of data replication engine 300 detecting that a set of storage nodes 130 has gone down and causing data replication is shown. In the illustrated embodiment, there is metadata service 140, upgrade groups 120A-F having storage nodes 130, and data replication engine 300. Also as shown, metadata service 140 includes metadata nodes 410A-B that share sessions 415A-B respectively with storage nodes 130C and 130J. Moreover, in the illustrated embodiment, storage nodes 130A, C, F, and H initially store extent 310A and storage nodes 130B, E, G, and J initially store extent 310B. The illustrated embodiment may be implemented differently than shown. For example, there may be more or less storage nodes 130, upgrade groups 120, etc. than shown.

When a storage node 130 is deployed, in some embodiments, a corresponding metadata node 410 is deployed as well. A session 415 may be established between the storage node 130 and the metadata node 410 that enables the storage node 130 to store and access metadata, such as group assignment information 150, from metadata service 140. In various embodiments, the session 415 between a storage node 130 and a metadata node 410 is used to determine whether that storage node 130 have been taken down or otherwise crashed. In particular, if the session 415 ends, then data replication engine 300 may discover (e.g., via an interruption 420) that the storage node 130 is unavailable/crashed. The instance of data replication engine 300 that was elected leader may be responsible for detecting storage node 130 failures and for performing periodic server node availability checks and periodic extents 310 availability checks.

In various embodiments, data replication engine 300 is responsible for brining back the replication factor in the event of a storage node 130 failure or an availability zone 210 outage. For example, a placement policy may specify a replication factor of "4," indicating that there should be four copies of an extent 310 stored by storage service 110. Accordingly, if a storage node 130 fails, data replication engine 300 may execute a data replication procedure in which it causes one or more storage nodes 130 to store copies of those extents 310 that were on that storage node 130 in order to reach four copies again. But in certain cases, a storage node 130 is taken down as a part of an update and not in response to a failure. Thus, it may be desirable for data replication engine 300 to delay (or not initiate) that data replication procedure when it detects that a storage node 130 is down. Accordingly, in various embodiments, data replication engine 300 executes the data replication procedure in response to detecting that at least two storage nodes 130 in at least two different upgrade groups 120 have gone down.

Consider an example where initially storage node 130C becomes unavailable and then storage node 130J becomes unavailable. Data replication engine 300 receives an interruption 420 that indicates that session 415A has ceased. In some embodiments, data replication engine 300 periodically may poll metadata service 140 or attempt to interact with storage nodes 130C itself instead of receiving an interruption 420. Data replication engine 300 then determines that storage node 130C is down but does not initiate (or delays initiation of) the data replication procedure. In many cases, storage node 130C is taken down as part of an update to the storage nodes 130 of upgrade group 120B. Thus, data replication engine 300 may receive interruptions 420 indicating that sessions 415 of those other storage nodes 130 have also ceased. But since those storage nodes 130 are a part of the same upgrade group 120, data replication engine 300 does not initiate the data replication procedure, in some embodiments. Data replication engine 300 may determine that those storage nodes 130 belong to the same group by accessing their group identifiers 225 from metadata service 140 (e.g., via metadata requests 320 and metadata responses 325).

Subsequently, in this example, data replication engine 300 receives an interruption 420 that indicates that session 415B has ceased. Data replication engine 300 determines that storage node 130J is down and accesses its group identifier 225 from metadata service 140. Thereafter, data replication engine 300 determines that storage node 130C and storage node 130J belong to different groups based on the group identifier 225 of storage node 130C being different than the group identifier 225 of storage node 130J. Data replication engine 300 may then initiate the data replication procedure. In various embodiments, data replication engine 300 interacts with metadata service 140 to obtain group assignment information 150 and extent replication information that indicates what extents 310 are stored by a given storage node 130. Based on the extent replication information, data replication engine 300 may determine that storage node 130C stored extent 310A and storage node 130J stored extent 310B, as shown. Based on group assignment information 150, data replication engine 300 may select storage node 130D to store extent 310A and storage node 130I to store extent 310B. Accordingly, data replication engine 300 may issue store requests 330 to those storage nodes 130I. In response to receiving a store request 330, storage node 130D may access extent 310A from storage node 130A while storage node 130I may access extent 310B from storage node 130B. As a result, the number of copies of extents 310A and 310B may be returned to four. In some embodiments, the leader instance of data replication engine 300 marks extents 310A and 310B as under-replicated and then the worker instances of data replication engine 300 work on these under-replicated extents to bring back replication factor.

Figure 5:
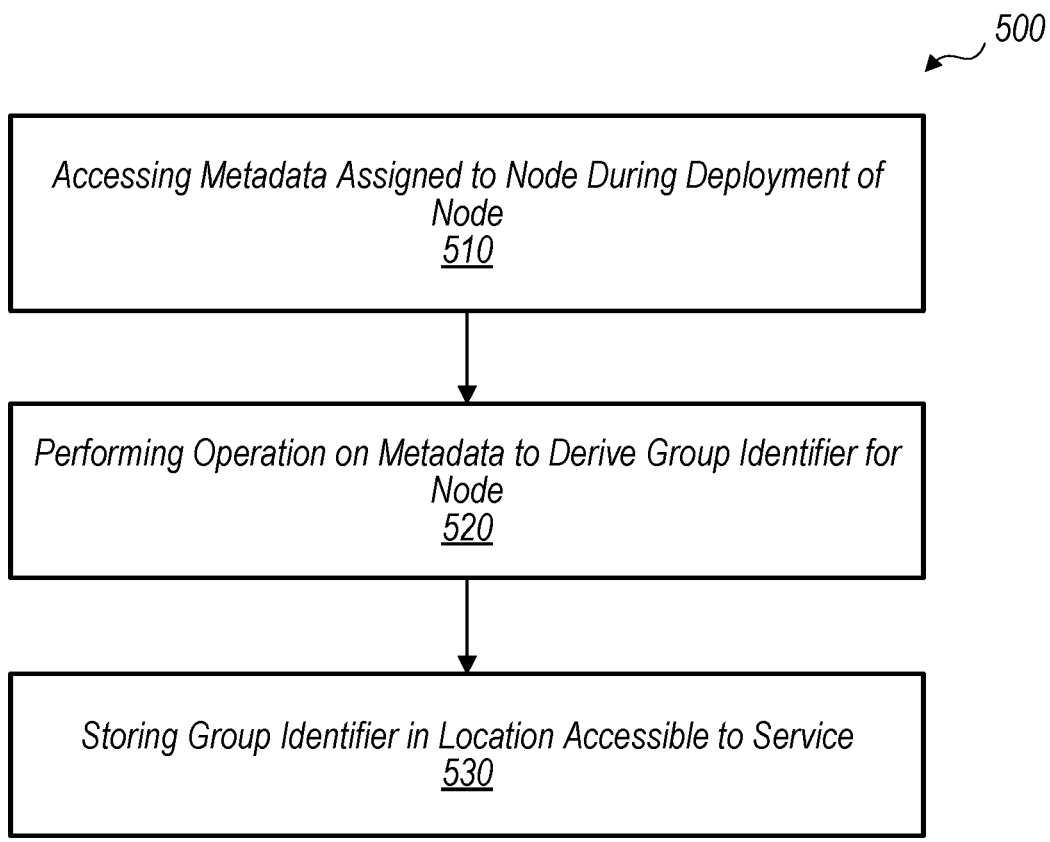
FIG. 5 is a flow diagram illustrating example method relating to a node identifying its membership in a group, according to some embodiments.

Turning now to FIG. 5, a flow diagram of a method 500 is shown. Method 500 is one embodiment of a method performed by a node of a computer system (e.g., a storage node 130 of system 100) to identify the node's membership in a group (e.g., an upgrade group 120). In various embodiments, method 500 is performed by executing program instructions stored on a non-transitory computer-readable medium. Method 500 might include more or less steps than shown. For example, method 500 may include a step in which the node is elected to be a leader node of a data replication service.

Method 500 begins in step 510 with the node accessing metadata (e.g., node metadata 135) assigned to the node during deployment of the node. In various cases, the node is one of a plurality of nodes associated with a service (e.g., the storage service) that is implemented by the computer system. In various embodiments, the set of groups is distributed across distinct computer zones (e.g., availability zones 210).

In step 520, the node performs an operation on the metadata to derive a group identifier (e.g., a group identifier 225) for the node. The group identifier indicates the node's membership in one of a set of groups of nodes managed by the service. In various embodiments, performing the operation on the metadata includes performing a modulo operation (e.g., x modulo 12) on the numerical property (e.g., deployment number 220) to derive the group identifier. The group identifier may further indicate the node's computer zone. A given one of the set of groups may be an update group that defines a set of nodes that are upgraded at least partially in parallel. In step 530, the node stores the group identifier in a location (e.g., at metadata service 140) that is accessible to the service.

In some embodiments, the node implements a placement policy to ensure that a set of files (e.g., extents 310) is distributed across the plurality of nodes such that the set of files can be accessed from at least a threshold number of groups of the set of groups of nodes managed by the service. The set of groups may be distributed across distinct computer zones and the set of files may be distributed such that the set of files can be accessed from at least two groups within a given one of the distinct computer zones. In some cases, the node detects that nodes in at least two of the set of groups of nodes managed by the service have become unavailable. In response to the detecting, the node may cause one or more files that were stored on the nodes to be replicated on other nodes of the plurality of nodes. The detecting may include: receiving an indication (e.g., an interruption 420) that a first node (e.g., storage node 130F) and a second node (e.g., storage node 130C) have become unavailable; accessing, from the location, a first group identifier corresponding to the first node and a second group identifier corresponding to the second node; and determining that the first and second nodes belong to different groups based on the first and second group identifiers indicating different groups, which might belong to different computer zones.

In some cases, the node makes a determination that the first and second nodes belong to the same group based on group identifiers that are maintained at the location accessible to the service. Based on the determination, the node may determine to not cause one or more files stored on the first and second nodes to be replicated on other nodes of the plurality of nodes.

Figure 6:
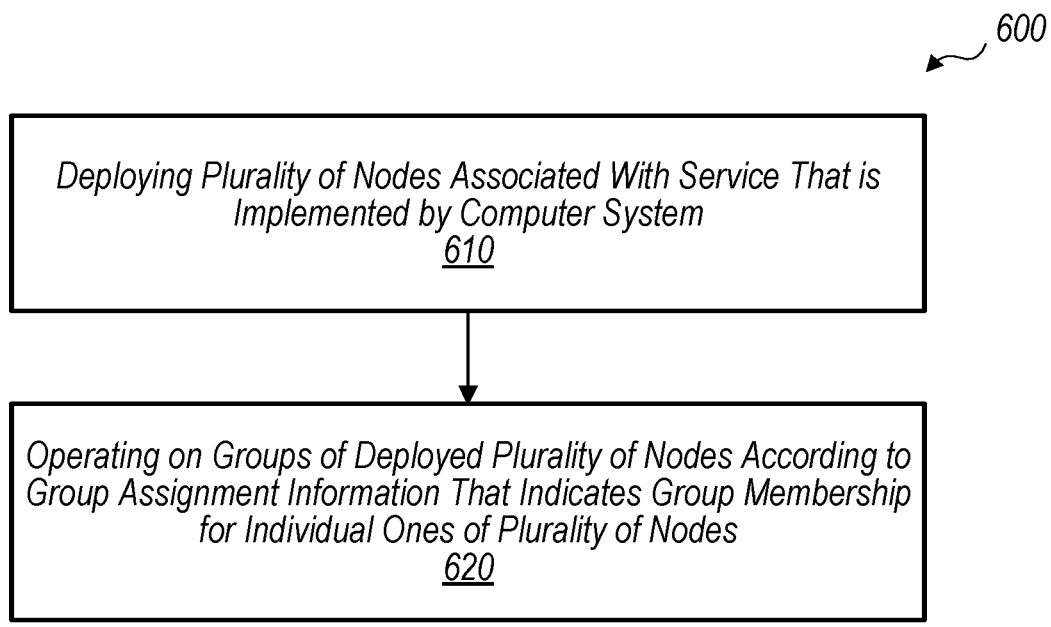
FIG. 6 is a flow diagram illustrating example method that relates to operating on groups of deployed nodes, according to some embodiments.

Turning now to FIG. 6, a flow diagram of a method 600 is shown. Method 600 is one embodiment of a method performed by a computer system (e.g., system 100) in order to operate on groups of deployed nodes (e.g., storage nodes 130). In some embodiments, method 600 is performed by executing program instructions stored on a non-transitory computer-readable medium. Method 600 might include more or less steps than shown. For example, method 600 may include a step in which the node is elected to be a leader node of a data replication service.

Method 600 begins in step 610 with the computer system deploying a plurality of nodes associated with a service implemented by the computer system. The number of the groups of the deployed plurality of nodes may be fixed (e.g., fixed at 12 groups), and the deploying may be performed according to a round robin scheme.

In step 620, the computer system operates on groups of the deployed plurality of nodes according to group assignment information (e.g., assignment information 150) that indicates group membership for individual ones of the nodes. The group assignment information for a given one of the plurality of nodes is derived by the given node, after the deploying, from metadata (e.g., node metadata 135) assigned to the given node during the deploying. In various embodiments, the metadata for the given node specifies a numerical property (e.g., deployment number 220) associated with the given node. Accordingly, the given node may be operable to derive its group assignment information by performing a modulo operation on the numerical property. In some embodiments, the group assignment information is maintained at a metadata node cluster (e.g., metadata service 140) that comprises a set of nodes (e.g., metadata nodes 410) that is different than the deployed plurality of nodes. The computer system may cause nodes of a first one of the groups to be updated before nodes of a second one of the groups. The computer system may also perform an election to elect one of the plurality of nodes to be a leader node that ensures data is distributed across the plurality of nodes in accordance with a placement policy. In various embodiments, the leader node is operable to distribute the data based on the group assignment information.

Exemplary Multi-Tenant Database System

Figure 7:
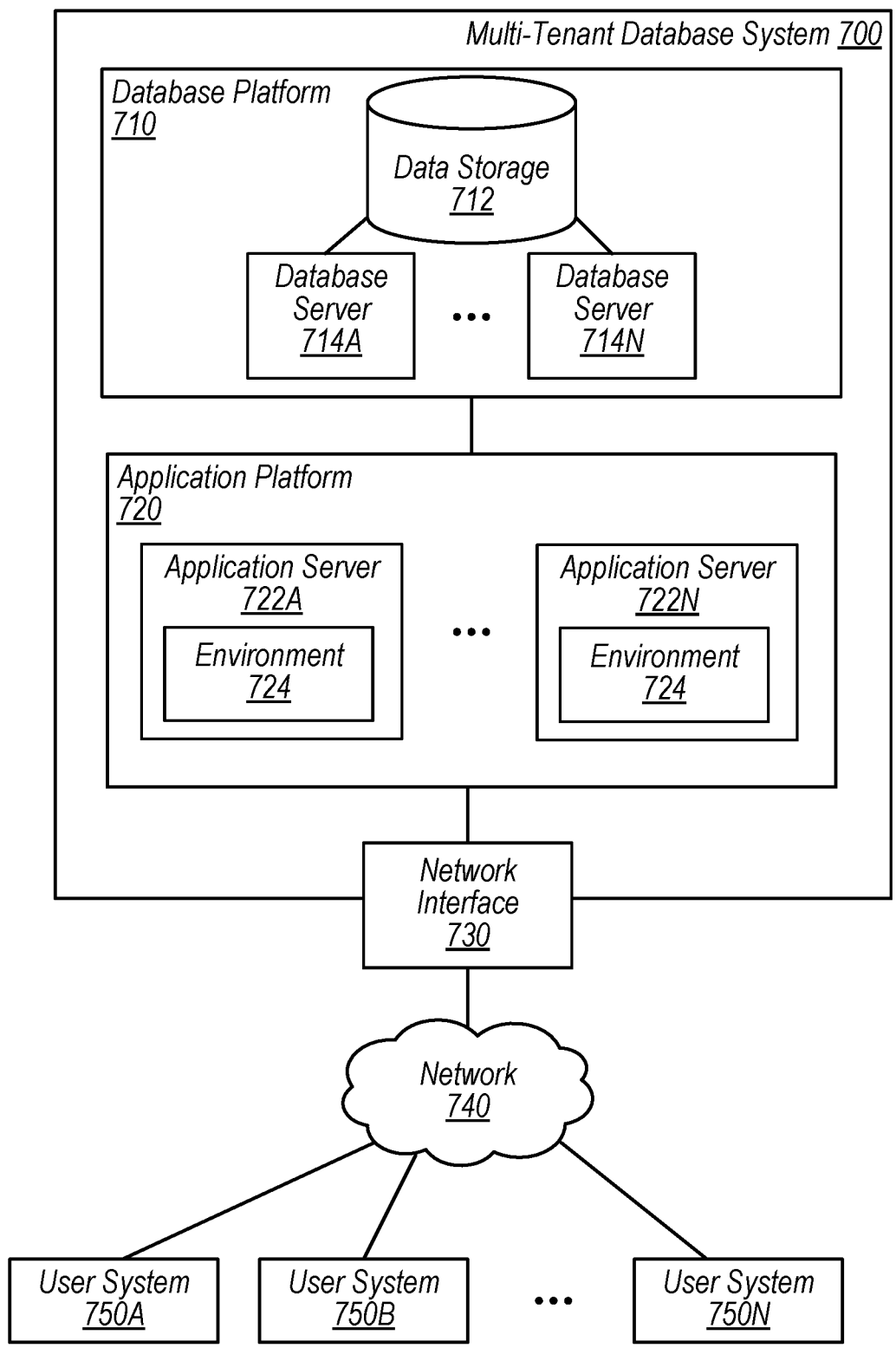
FIG. 7 is a block diagram illustrating elements of a multi-tenant system, according to some embodiments.

Turning now to FIG. 7, an exemplary multi-tenant database system (MTS) 700 in which various techniques of the present disclosure can be implemented is shown—e.g., system 100 may be MTS 700. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns. Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files (e.g., extents 310) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 712 is organized as part of a log-structured merge-tree (LSM tree). An LSM tree normally includes two high-level components: an in-memory buffer and a persistent storage. In operation, a database server 714 may initially write database records into a local in-memory buffer before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 714, in various embodiments, are hardware elements, software routines, or a combination thereof capable of providing database services, such as data storage, data retrieval, and/or data manipulation. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree—database servers 714 maintain the LSM tree implemented on database platform 710. In some embodiments, database servers 714 implement a relational database management system (RDMS) or object oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VB Script.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
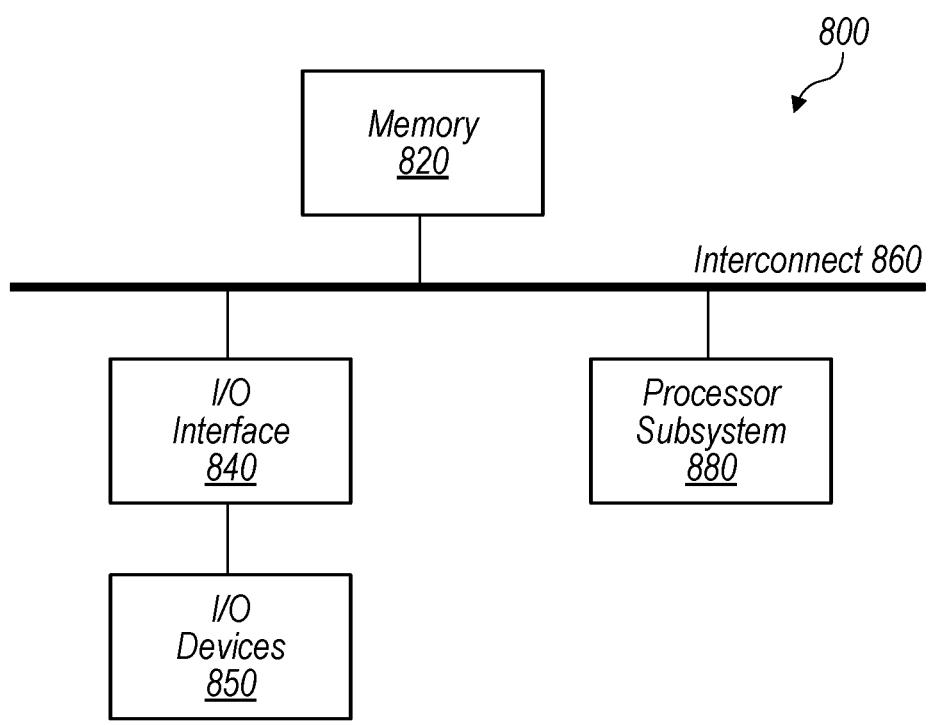
FIG. 8 is a block diagram illustrating elements of a computer system for implementing various systems described in the present disclosure, according to some embodiments.

Turning now to FIG. 8, a block diagram of an exemplary computer system 800, which may implement system 100, a storage node 130, a metadata node 410, MTS 700, and/or user system 750, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement data replication engine 300 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

accessing, by a software node executing on a computer system, metadata assigned to the software node during deployment of the software node, wherein the software node is one of a plurality of software nodes associated with a service implemented by the computer system, and wherein the metadata assigned to the software node specifies a numerical property associated with the software node;

performing, by the software node, a modulo operation on the numerical property of the metadata to derive a group identifier for the software node, wherein the group identifier indicates the software node's membership in a particular group of a set of groups of software nodes managed by the service; and storing, by the software node, the group identifier in a location accessible to the service, wherein the storing of the group identifier permits the software node to be operated on when an operation is performed on the particular group.

2. The method of claim 1, wherein the set of groups is distributed across distinct computer zones, and wherein the group identifier further indicates the software node's computer zone.

3. The method of claim 1, further comprising:

implementing, by the software node, a placement policy to ensure that a set of files is distributed across the plurality of software nodes such that the set of files can be accessed from at least a threshold number of groups of the set of groups of software nodes managed by the service.

4. The method of claim 3, wherein the set of groups is distributed across distinct computer zones, and wherein the set of files is distributed such that the set of files can be accessed from at least two groups within a given one of the distinct computer zones.

5. The method of claim 3, further comprising:

detecting, by the software node, that software nodes in at least two of the set of groups of software nodes managed by the service have become unavailable; and in response to the detecting, the software node causing one or more files that were stored on the software nodes to be replicated on other software nodes of the plurality of software nodes.

6. The method of claim 5, wherein the detecting includes:

receiving, by the software node, an indication that a first software node and a second software node have become unavailable;

accessing, from the location by the software node, a first group identifier that corresponds to the first software node and a second group identifier that corresponds to the second software node; and determining that the first and second software nodes belong to different groups based on the first and second group identifiers indicating different groups.

7. The method of claim 5, wherein the set of groups is distributed across distinct computer zones, and wherein the at least two groups belong to different computer zones.

8. The method of claim 1, further comprising:

detecting, by the software node, that a first software node and a second software node have become unavailable;

making, by the software node, a determination that the first and second software nodes belong to the same group based on group identifiers maintained at the location accessible to the service; and based on the determination, the software node determining to not cause one or more files stored on the first and second software nodes to be replicated on other software nodes of the plurality of software nodes.

9. The method of claim 1, wherein a given one of the set of groups is an update group that defines a set of software nodes that are upgraded at least partially in parallel.

10. A non-transitory computer readable medium having program instructions stored thereon that are capable of causing a computer system to implement a software node that performs operations comprising:

accessing metadata assigned to the software node during deployment of the software node, wherein the software node is one of a plurality of software nodes associated with a service implemented by the computer system, and wherein the metadata assigned to the software node specifies a numerical property associated with the software node;

performing a modulo operation on the numerical property of the metadata to derive a group identifier for the software node, wherein the group identifier indicates the software node's membership in a particular group of a set of groups of software nodes managed by the service; and storing the group identifier in a location accessible to the service, wherein the storing of the group identifier permits the software node to be operated on when an operation is performed on the particular group.

11. The medium of claim 10, wherein the operations further comprise:

detecting that at least two of the plurality of software nodes have become unavailable;

determining that the at least two software nodes belong to at least two different groups of the set of groups based on group identifiers maintained at the location accessible to the service; and based on the determining, causing one or more files that were stored on the at least two software nodes to be replicated on other software nodes of the plurality of software nodes.

12. The medium of claim 10, wherein two or more of the plurality of software nodes implement a data replication application that is operable to elect one of the two or more software nodes to be a leader software node that ensures data is distributed across the plurality of software nodes, and wherein the operations further comprise:

in response to the software node being elected, causing a particular set of files to be distributed across the plurality of software nodes in accordance with a placement policy.

13. A method, comprising:

deploying, by a computer system, a plurality of software nodes onto one or more resources of a computer infrastructure, wherein the plurality of software nodes are associated with a service that is implemented by the computer system; and operating, by the computer system, on groups of the deployed plurality of software nodes according to group assignment information that indicates group membership for individual ones of the plurality of software nodes;

wherein the group assignment information for a given one of the plurality of software nodes is derived by the given software node, after the deploying, from metadata assigned to the given software node during the deploying, wherein the metadata for the given software node specifies a numerical property associated with the given software node, and wherein the given software node is operable to derive its group assignment information by performing a modulo operation on the numerical property.

14. The method of claim 13, wherein a number of the groups of the deployed plurality of software nodes is fixed, and wherein the deploying is performed according to a round robin scheme.

15. The method of claim 13, further comprising:
performing, by the computer system, an election to elect one of the plurality of software nodes to be a leader software node that ensures data is distributed across the plurality of software nodes in accordance with a placement policy, wherein the leader software node is operable to distribute the data based on the group assignment information.

16. The method of claim 13, wherein the group assignment information is maintained at a metadata node cluster that comprises a set of software nodes that is different than the deployed plurality of software nodes.

17. The method of claim 13, wherein operating on the groups includes:
causing, by the computer system, software nodes of a first one of the groups to be updated before software nodes of a second one of the groups.

* * * * *